United States Patent
Lawrence-Apfelbaum

(10) Patent No.: US 9,342,818 B2
(45) Date of Patent: May 17, 2016

(54) SYSTEM AND METHOD FOR MANAGING INCOMING AND OUTGOING EMAIL MESSAGES

(75) Inventor: Marc Jeffrey Lawrence-Apfelbaum, New York, NY (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 936 days.

(21) Appl. No.: 13/315,394

(22) Filed: Dec. 9, 2011

(65) Prior Publication Data
US 2013/0151630 A1 Jun. 13, 2013

(51) Int. Cl.
*G06F 15/16* (2006.01)
*G06Q 10/10* (2012.01)

(52) U.S. Cl.
CPC .................................. *G06Q 10/107* (2013.01)

(58) Field of Classification Search
CPC ................................ H04L 51/04; H04L 51/32
See application file for complete search history.

(56) References Cited

U.S. PATENT DOCUMENTS

| 6,496,852 B1* | 12/2002 | Yamaguchi | 709/206 |
|---|---|---|---|
| 7,617,284 B2* | 11/2009 | Salamuniccar | 709/206 |
| 7,617,285 B1* | 11/2009 | Hartmann | 709/206 |
| 7,904,525 B2* | 3/2011 | Eggers, Jr. | G06Q 10/107 709/206 |
| 2005/0198180 A1* | 9/2005 | Khanolkar et al. | 709/206 |
| 2006/0036694 A1* | 2/2006 | Pricken et al. | 709/206 |
| 2011/0173548 A1* | 7/2011 | Madnani | 715/752 |

* cited by examiner

*Primary Examiner* — Mohamed Ibrahim
(74) *Attorney, Agent, or Firm* — The Marbury Law Group, PLLC

(57) ABSTRACT

A system and method for managing incoming email messages. A computing device operating an email client receives an incoming email message from an email server. A first time rule is applied to a time attribute in the email header. The email message is saved in a hidden folder when the time attribute satisfies the first time rule. A second time rule is applied to a current time. When the current time satisfies the second time rule, email messages in the hidden folder are moved to a folder that is accessible to the email client.

16 Claims, 6 Drawing Sheets

From server@coldmail.com Tue Aug 11 15:58:02 2011Delivered-To: fred@boohoo.com
Received: from coldmail.com (f148.coldmail.com 207.82.251.27)
by fred@boohoo.com (VMailer) via SMTP
id 194D517D0C; Tue, 11 Aug 2011 15:57:26 -0400 (EDT)
Received: (qmail 10862 invoked by uid 0);11 Aug 2000 19:59:38 -0000
Message-ID: <20000811195938.10861.qmail@coldmail.com>
Received: from 208.194.21.2 by www.hotmail.com with HTTP;
Tue, 11 Aug 2011 12:59:36 PDT
X-Originating-IP: [208.194.21.2]
From: "Bossman."
To: fred@boohoo.com
Subject:
Content-Type: text/plain
Date: Tue, 11 Aug 2011 12:59:36 PDT
Content-Length: 2093
Lines: 57
Status: RO

FIG. 1

From server@coldmail.com Tue Aug 11 15:58:02 2011Delivered-To: fred@boohoo.com
Received: from coldmail.com (f148.coldmail.com 207.82.251.27)
by fred@boohoo.com (VMailer) via SMTP
id 194D517D0C; Tue, 11 Aug 2011 15:57:26 -0400 (EDT)
Received: (qmail 10862 invoked by uid 0);11 Aug 2000 19:59:38 -0000
Message-ID: <20000811195938.10861.qmail@coldmail.com>
Received: from 208.194.21.2 by www.hotmail.com with HTTP;
Tue, 11 Aug 2011 12:59:36 PDT
X-Originating-IP: [208.194.21.2]
From: "Bossman."
To: fred@boohoo.com
Subject:
Content-Type: text/plain
Date: Tue, 11 Aug 2011 12:59:36 PDT
Content-Length: 2093
Lines: 57
Status: RO

SYSTEM AND METHOD FOR MANAGING INCOMING AND OUTGOING EMAIL MESSAGES

BACKGROUND

Electronic mail, commonly called email or e-mail, allows a sender to convey a message to one or more recipients over a network (such as the Internet). Email is generated and retrieved using an email client. An email server accepts, forwards, delivers and stores messages. By using a store and forward model, neither the sender nor the recipient is required to be online simultaneously.

An email message consists of three components, the message envelope, the message header, and the message body. The message header contains control information, including, minimally, an originator's email address and one or more recipient addresses. Usually descriptive information is also added, such as a subject header field and a message submission date/time stamp.

Messages are exchanged between hosts using the Simple Mail Transfer Protocol with software programs called mail transfer agents (MTAs); and delivered to a mail store by programs called mail delivery agents (MDAs, also sometimes called local delivery agents, LDAs). Users can retrieve their messages from servers using standard protocols such as POP or IMAP, or, as is more likely in a large corporate environment, with a proprietary protocol specific to Novell Groupwise, Lotus Notes or Microsoft Exchange Servers. Webmail interfaces allow users to access their mail with any standard web browser, from any computer, rather than relying on an email client. Programs used by users for retrieving, reading, and managing email are called mail user agents (MUAs).

Mail may be stored on the client, on the server side, or in both places. When IMAP is used, the messages reside on a server that is remote from the user's computer. IMAP does not actually move messages onto the local computer. When using POP, an email client checks the POP server for new messages and downloads all the new messages in an inbox supported by the client. Typically, a POP client will delete downloaded messages from the server.

Email clients are no longer limited to desktop computers. Tablets, smartphones and other portable devices can connect to an email server and alert a user that new messages are available. In this environment, users are "tethered" to an email server. While this keeps a user connected, it also disrupts private lives, interrupts social activities and draws the user into preparing a response.

SUMMARY

Embodiments are directed to managing the receipt of email over an email enterprise network during times specified by a user or by an enterprise wide email server. In an embodiment, an email client is configured to store emails in a folder that is visible on the client only during specified time periods, and flexibly "blacked out" during other time periods according to "visibility rules." In another embodiment, exceptions to the visibility rule may be specified to allow particular emails to be viewed during the specified time period. In another embodiment, an email server sets rules for client classes and conveys those rules to those client classes, as members of the classes are installed on the email enterprise network.

DESCRIPTION OF THE DRAWINGS

FIG. 1 is a block diagram illustrating a typical email header as is known in the art.

DETAILED DESCRIPTION

Embodiments are directed to managing the receipt of email during times specified by a user.

FIG. 1 is a block diagram illustrating a typical email header as is known in the art. The information contained in a full email header is standard, regardless of the origin and destination. Each time the email is transferred, the transfer agent adds a new line that shows what service received it, what service transferred the email, for what recipient, and by what type of mail service. Email sent through ISPs use the SMTP notation to show a mail transfer. Webmail services like Gmail, Yahoo, and hotmail will show an HTTP (internet) transfer. The delivery date and time (a "time attribute") are always displayed in the header as local time offset from Universal Time. (EST displays as the Universal Time minus 5 hours). The sender's time should also display as an offset from UT.

Figure 2:
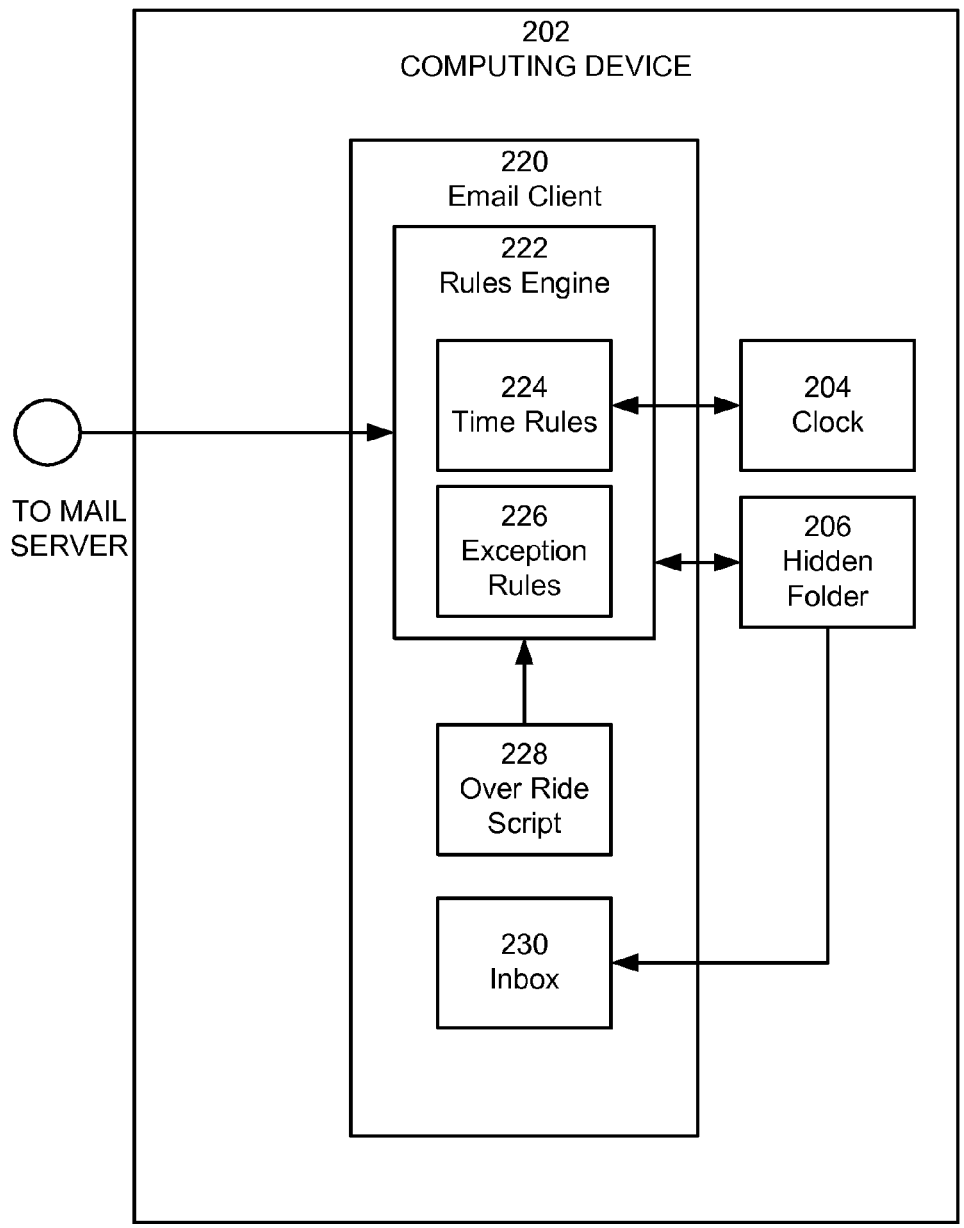
FIG. 2 is a block diagram illustrating an email client configured with a rules engine according to an embodiment.

FIG. 2 is a block diagram illustrating an email client configured with a rules engine according to an embodiment.

An email client 220 operates on a computing device 202. The typical components of a computing device, such as computing device 202 are illustrated in FIG. 2. The computing device may a desktop computer, a laptop computer, a tablet, a smartphone or any other device capable of accessing an email server over a network. The computing device 202 also comprises a clock 204 and a hidden folder 206.

In an embodiment, a "hidden folder" is a folder that is assigned a "hidden" attribute. When a list of folders is viewed through an operating system that recognizes the attribute, folders marked "hidden" are not included in the list of folders.

The email client 220 comprises a rules engine 222. The rules engine 222 receives emails from a mail server (not illustrated) and applies time rules 224 and exception rules 226 to the header information of each received email (collectively "visibility rules"). As illustrated in FIG. 1, the header of an email message at least includes a sent time, a received time and the sender's user name (a "sender attribute"). The rules engine 222 may apply rules using a processor of computing device 202 or a processor dedicated to the rules engine.

In an embodiment, the rules engine 222 applies a time rule 224 to each incoming email. The time rule may be applied to the time the email was sent from the originating email server or the time the email was received by the receiving email server. A first time rule may establish a time, a date or a range of time and dates, during which an incoming email is directed to a hidden folder 206. A second time rule may establish a time, a date or a range of time and dates, during which emails stored in the hidden folder 206 are transferred to the inbox 230. The rules engine 222 consults with a local clock 204 to determine when to transfer the messages stored in the hidden folder.

The exception rules 226 are applied to the header information of the incoming email, which information may include the domain of the sender, the sender's name, and the subject of the incoming email, either individually or in combination. When a match is found in the header to the exception rule, the exception rule will overrule the time rules and cause an email message to be delivered to the inbox 230.

For example, the user of the email client 220 may establish a library of exception rules for selected individuals (family and friends) based on the sender name and a library of exception rules based on a domain name from which an email originates (e.g., a particular vendor). The user may also establish a "hot code" that when inserted in the subject line will overrule the time rules. For example, the hot code may be "14me" (one for me). The subject line could read, "Meet You At Joe's Coffee 14me."

The time rules and the exception rules may also be configured such that some or all of the exception rules are disabled at certain times. For example, during the dinner hour, only messages with the hot code may be received even if the message is from a sender that identified in the user's library of exception rules.

In an embodiment, an enterprise may provide members of the enterprise with an email client 220 that is configured to include a hot code for use by members and/or selected clients, consultants and other third parties. In this way, the enterprise may overrule the time rules for critical communications.

The embodiment noted above covers both outgoing as well as incoming email. Since all outgoing messages are "incoming" messages for a recipient, the time rules 224 will direct the message to the hidden folder 206 of the appropriate recipient (s). The default rules would dictate that such messages are stored until the start of working hours for the recipient(s) for the next business day. Since people write, read and respond to emails around the clock, receipt of messages adds to the sense that everyone is expected to respond immediately. For those organizations wishing to break the "always working" cycle, storing emails until the next morning helps to break the cycle, while still allowing individuals the ability to work on their own matters after hours if they want to do so.

In an alternate embodiment, the hidden folder 206 may also store outgoing emails subject to a time embargo dictated by the rules engine 222 and the associated time rules 224. In this fashion, e-mails will not even reach the IMAP server (FIG. 3, 302) until such time as the time rule dictates that release is appropriate. In this embodiment, an individual may work anytime that person wishes and can compose and "send" e-mails to potential recipients. However according to enterprise rules that may be set by the IMAP server, those e-mails will not be sent until a particular time of day.

Figure 3:
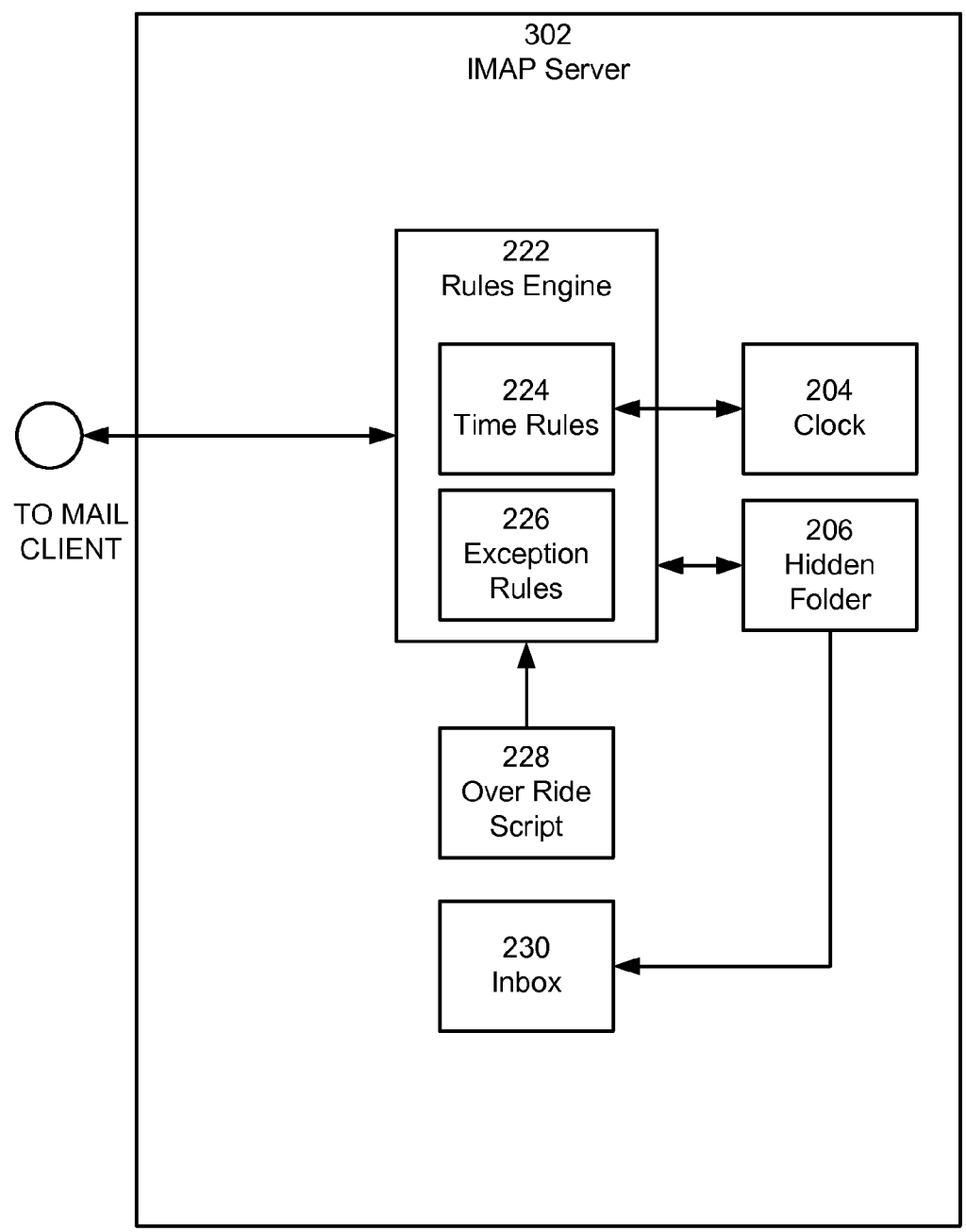
FIG. 3 is a block diagram illustrating the operation of an IMAP server rules engine according to an embodiment.

FIG. 3 illustrates the operation of the rules engine 222 on an IMAP server 302. In this embodiment, the IMAP server 302 manages the time rules 224, the exception rules 226, and the override script 228. In an embodiment, the IMAP server 302 is operated by an enterprise. The enterprise may control the use of the time rules of its members under certain circumstances. For example, the enterprise may configure the exception rules 226 to include a hot code for use by members and/or selected clients, consultants and other third parties that will overrule the time rules. Alternatively, the IMAP server 302 may detect emails marked urgent that are sent during a time when the time rules are operative. In this situation, the IMAP server 302 may respond to the sender that the message will not be delivered until after a certain time. The response to the sender may also include a one time hot code that will overrule the time rules. The one time hot code is added to the email recipient's exception rules 226 allowing the Enterprise to overrule the time rules for critical communications.

Figure 4:
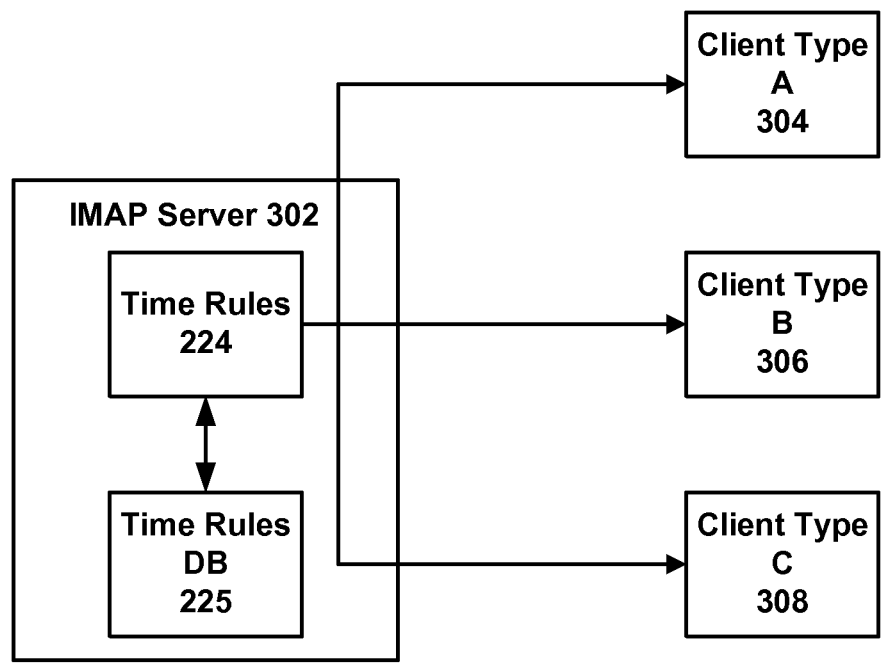
FIG. 4 is a block diagram illustrating an IMAP server providing email rules to email client classes according to an embodiment.

Referring to FIG. 4, an IMAP server is illustrated providing email rules to email client classes. In another embodiment the IMAP Server 302 sets up each new client as those clients are installed on the enterprise network. In this example, the IMAP server has a database of rules 225 establishing email conditions for various levels of employees. It may be that Client Type A 304 comprises senior executives who are to receive email whenever it is sent, whereas Client Type B 306 has more restrictive email policy (i.e. only during business hours). Client Type C 308 may comprise clients in different time zones, thus requiring different time settings in the rules database 225. In this fashion the company may set company-wide policies based on the employee position within the company yet have rules in the rules database 225 allowing certain communications to override any rule for immediate delivery of messages to the clients regardless of position or initial rule settings thereby preserving the ability of the company to override individual settings for important communications.

Figure 5:
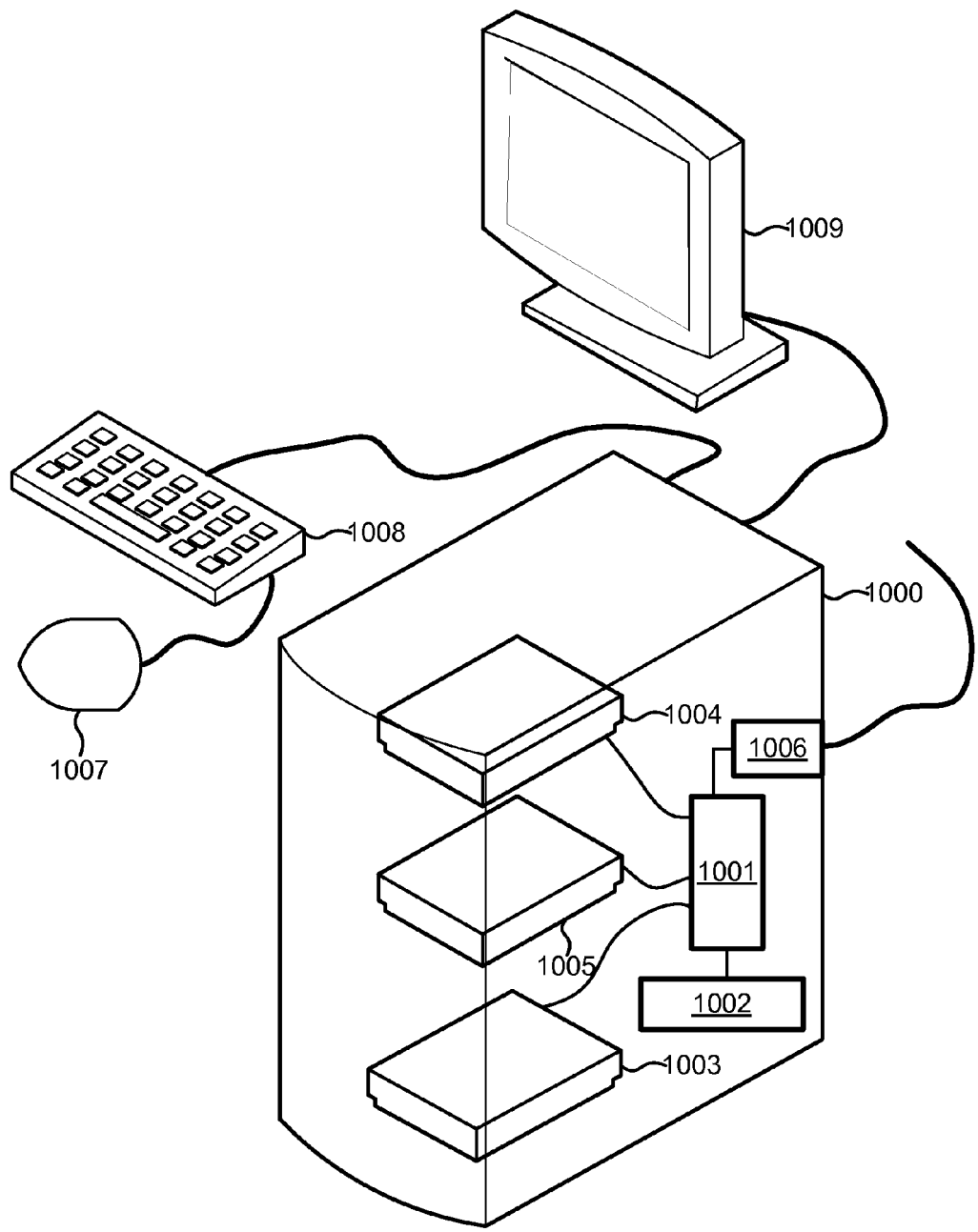
FIG. 5 is a block diagram illustrating a computing device.

FIG. 5 is a block diagram of a computing device suitable for use with any of the embodiments.

As previously described, the subscriber may interact with the various servers and network components using a variety of the computing devices, including a personal computer. By way of illustration, the functional components of a computing device 1000 are illustrated in FIG. 5. Such a computing device 1000 typically includes a processor 1001 coupled to volatile memory 1002 and a large capacity nonvolatile memory, such as a disk drive 1003. Typically, software applications, such as an email client, may be stored in the internal memory 1002 before they are accessed and loaded into the processor 1001. The processor 1001 may include internal memory sufficient to store the application software instructions.

The computing device 1000 may also include a floppy disc drive 1004 and a compact disc (CD) drive 1005 coupled to the processor 1001. Typically the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections or for receiving external memory devices, such as a USB or FireWire® connector sockets. In a notebook configuration, the computer housing includes the pointing device 1007, keyboard 1008 and the display 1009 as is well known in the computer arts.

While the computing device 1000 is illustrated as using a desktop form factor, the illustrated form is not meant to be limiting. For example, some or all of the components of computing device 1000 may be implemented as a desktop computer, a laptop computer, a mini-computer, or a personal data assistant.

Figure 6:
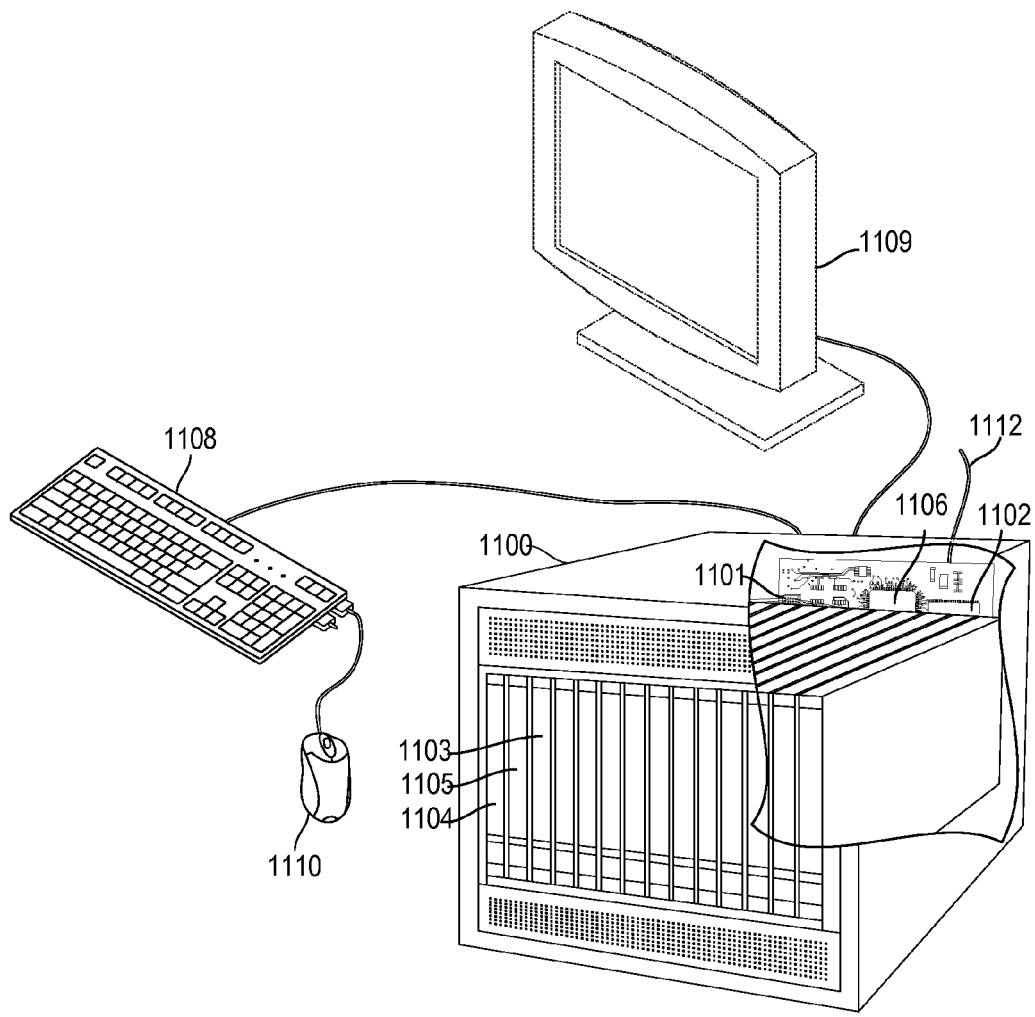
FIG. 6 is a block diagram illustrating a server device

The various embodiments may also be implemented on any of a variety of commercially available server devices, such as the server 1100 illustrated in FIG. 6. Such a server 1100 typically includes a processor 1101, for execution of the visibility rules or the performance of the tasks of an email server, coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001, 1101 may be any programmable microprocessor, microcomputer or multiple processor chip or chips that can be configured by software instructions (applications) to perform a variety of functions, including the functions of the visibility rules as illustrated in various embodiments described above.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media include both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor- readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A computing device for managing incoming email comprising:
   a processor;
   a hidden folder accessible to an email client; and
   a second folder accessible to the email client, wherein the hidden folder is not displayed by the email client of the computing device and the second folder is displayed by the email client, and wherein,
   the processor is configured with processor-executable instructions to perform operations comprising:
      receiving a first email message, wherein the first email message comprises a first email header;
      applying a first time rule to the first email header, wherein the first email header comprises a time label and a time value and wherein the first time rule comprises a first time period during which the first email message should not be delivered to a recipient;

storing the first email message in the hidden folder when the time value associated with the time label of the first email header satisfies the first time rule;

generating and sending a response to the first email message comprising an one time hot code to override the first time rule;

adding the one time hot code to exception rules of the recipient:

receiving a second email message comprising the one time hot code;

storing the second email message in the second folder based on the one time hot code; and storing the first email message in the second folder when the time value associated with the time label of the email header does not satisfy the first time rule.

2. The computing device of claim 1, wherein the processor is further configured with processor-executable instructions to perform operations comprising:

applying an exception rule to the first email header, wherein the first email header comprises one or more first email header labels each assigned a first email header label value and wherein the exception rule comprises an exception rule value associated with at least one of the first email header labels;

overruling the first time rule when the first email header label value assigned to the one or more first email header labels matches the exception rule value; and storing the first email message in the second folder.

3. The computing device of claim 2, wherein the first email header label is a subject label, wherein the exception rule value is a value associated with the subject label, and wherein overruling the first time rule when a value assigned to the header label matches the exception rule value comprises overruling the first time rule when the value assigned to the subject label contains the exception rule value.

4. The computing device of claim 3, wherein the exception rule value is an overrule code.

5. The computing device of claim 2, wherein the first email header labels further comprise one or more of a sender name, a sender IP address, a sender domain name, and a subject.

6. The computing device of claim 1, wherein the time label further comprises one or more of a time the email message is sent and a time the email message is received.

7. The computing device of claim 1, wherein the computing device comprises a clock, and wherein the processor is further configured with processor-executable instructions to perform operations comprising:

accessing a current time from the clock;

applying a second time rule based on the current time, wherein the second time rule comprises a second time period during which the first message should be delivered to the recipient; and storing the first message stored in the hidden folder to the second folder when the current time satisfies the second time rule.

8. A method for managing incoming email comprising:

receiving on a computing device a first email message from an email server, wherein the first email message comprises a first email header;

applying by a processor a first time rule to the first email header, wherein the first email header comprises a time label and a time value and wherein the first time rule comprises a first time period during which messages should not be delivered to a recipient;

storing by the processor the first email message in a hidden folder when the time value associated with the time label of the first email header satisfies the first time rule, wherein the hidden folder is not displayed;

generating and sending a response to the first email message comprising an one time hot code to override the first time rule;

adding the one time hot code to exception rules of the recipient;

receiving a second email message comprising a second email header and the one time hot code; and storing by the processor the second email message in a second folder based on the time hot code; and storing by the processor the first email message in a second folder when the time value associated with the time label of the first email header does not satisfy the first time rule, wherein the second folder is displayed.

9. The method of claim 8 further comprising:

applying by the processor an exception rule to the first email header, wherein the first email header comprises one or more first email header labels each assigned a first email header label value and wherein the exception rule comprises an exception rule value associated with at least one of the first header labels;

overruling by the processor the first time rule when a value assigned to the one or more first email header labels matches the exception rule value; and storing by the processor the first email message to the second folder.

10. The method of claim 9, wherein the first email header label is a subject and the exception rule value is a value associated with the subject label and wherein overruling by the processor the first time rule when the value assigned to the subject label matches the exception rule value comprises overruling by the processor the first time rule when the value assigned to the subject label contains the exception rule value.

11. The method of claim 10, wherein the exception rule value is an overrule code.

12. The method of claim 9, wherein the first email header labels further comprise one or more of a sender name, a sender IP address, a sender domain name, and a subject.

13. The method of claim 8, wherein the time label further comprises one or more of a time the first email message is sent and a time the first email message is received.

14. The method of claim 8 further comprising:

accessing by the processor a current time from a clock;

applying by the processor a second time rule based on the current time, wherein the second time rule comprises a second time period during which messages should be delivered to the recipient; and storing by the processor the first email message stored in the hidden folder to the second folder when the second time rule is satisfied.

15. A computing device for managing outgoing email comprising:

a processor; and a hidden folder accessible to an email client, wherein the hidden folder is not displayed by the email client to a user of the computing device; and wherein the processor is configured with processor-executable instructions to perform operations comprising:

receiving a command to send a first outgoing email message from the computing device, wherein the first email message comprises a first email header;

applying a first time rule to the first email header, wherein the first email header comprises a time label associated with a time value and wherein the first time rule comprises a first time period during which the first email message should not be sent;

storing the first email message in the hidden folder when the time value associated with the time label satisfies the first time rule, wherein the send command is not executed;

generating and sending a response to the first email message comprising an one time hot code to override the first time rule;

adding the one time hot code to exception rules of a sender;

executing the send command for a second email message comprising the one time hot code; and sending the first email message when the time value associated with the time label does not satisfy the first time rule.

16. The computing device of claim 15, wherein the computing device comprises a clock and wherein the processor is configured with processor-executable instructions to perform operations further comprising:

accessing a current time from the clock;

applying a second time rule based on the current time, wherein the second time rule comprises a second time period during which messages may be sent by the sender;

sending the first email message stored in the hidden folder to an email server when the current time satisfies the second time rule.

\* \* \* \* \*